(12) United States Patent
Rothrock et al.

(10) Patent No.: US 9,513,893 B2
(45) Date of Patent: Dec. 6, 2016

(54) SCHEDULED DOWNLOADS: ENABLING BACKGROUND PROCESSES TO RECEIVE BROADCAST DATA

(75) Inventors: George Allen Rothrock, San Diego, CA (US); Jonathan McCartie, San Diego, CA (US); Nicholas Glassman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1258 days.

(21) Appl. No.: 12/677,272

(22) PCT Filed: Oct. 11, 2007

(86) PCT No.: PCT/US2007/081132
§ 371 (c)(1),
(2), (4) Date: Sep. 9, 2010

(87) PCT Pub. No.: WO2009/048473
PCT Pub. Date: Apr. 16, 2009

(65) Prior Publication Data
US 2011/0004678 A1    Jan. 6, 2011

(51) Int. Cl.
*G06F 15/16*     (2006.01)
*G06F 9/445*     (2006.01)
(Continued)

(52) U.S. Cl.
CPC .............. *G06F 8/65* (2013.01); *H04L 12/189* (2013.01); *H04L 67/04* (2013.01)

(58) Field of Classification Search
CPC ....................................................... H04L 67/04
(Continued)

(56) References Cited

U.S. PATENT DOCUMENTS 7,457,850 B1    11/2008  Ukigawa et al.
8,914,015 B2    12/2014  Kim et al.
(Continued)

FOREIGN PATENT DOCUMENTS

CN    1222817 A    7/1999
CN    1446439 A    10/2003
(Continued)

OTHER PUBLICATIONS

Automatic Adjustment of Calendar Entry Presentation based on the Current Timezone,ip.com Journal, ip.com Inc., West Henrietta, NY, US, Dec. 3, 2004 (Dec. 3, 2004), XP013022424,ISSN: 1533-0001.
(Continued)

*Primary Examiner* — Adnan Mirza
(74) *Attorney, Agent, or Firm* — James T. Hagler

(57) ABSTRACT

A digital broadcast network is disclosed that can provide scheduled updates for non-critical data in a different manner than critical data updates. Updates that included non-critical information can be scheduled to be broadcast, over a digital broadcast network, during an update window, which can be a specific period of time. Receiving devices can be notified of the update window and, utilizing background functionality, the non-critical updates can be accepted and applied at the receiving device. The non-critical updates might be accepted and applied during the update window if the receiving device is in an idle state or a period of low activity. The non-critical updates can be broadcast on a separate channel or stream. During periods other than during the update window, other data can be transmitted on the separate channel or stream. Critical updates can be applied in real-time.

38 Claims, 11 Drawing Sheets

(51) Int. Cl.
  *H04L 29/08* (2006.01)
  *H04L 12/18* (2006.01)
(58) Field of Classification Search
  USPC .................................................. 709/223, 224
  See application file for complete search history.

(56) References Cited

U.S. PATENT DOCUMENTS

2001/0029178 A1* 10/2001 Criss et al. .................... 455/419
2007/0150892 A1* 6/2007 Chaney ......................... 717/177

FOREIGN PATENT DOCUMENTS

| EP | 0762686 | 3/1997 |
|---|---|---|
| EP | 0905984 | 3/1999 |
| JP | 11098477 A | 4/1999 |
| JP | 2001154958 A | 6/2001 |
| JP | 2002064801 A | 2/2002 |
| JP | 2002544609 A | 12/2002 |
| JP | 2004347952 A | 12/2004 |
| JP | 2006018359 A | 1/2006 |
| JP | 2006029960 A | 2/2006 |
| JP | 2006165766 A | 6/2006 |
| JP | 2007116688 A | 5/2007 |
| JP | 2007201931 A | 8/2007 |
| KR | 100278759 | 10/2000 |
| WO | WO0069163 A2 | 11/2000 |
| WO | WO-0193600 A2 | 12/2001 |
| WO | WO-2007109630 A1 | 9/2007 |

OTHER PUBLICATIONS

International Search Report and Written Opinion—PCT/US2007/081132—ISA/EPO—Jun. 10, 2008.
Shiroida, K., "Windows ME Japanese version Speed Mastering," Monthly publication of PC style 21, Mainichi Communications Inc., Oct. 18, 2000. vol. 1, No. 11: 036-043 (Domestic Technical Magazine 2000-01198-001).

* cited by examiner

SCHEDULED DOWNLOADS: ENABLING BACKGROUND PROCESSES TO RECEIVE BROADCAST DATA

BACKGROUND

Field

The following description relates generally to content distribution systems and more particularly to content delivery and content receipt over a digital broadcast network.

Background

A digital broadcast network is a one-way delivery method to client-side software located on a user device. Datacast services provide data over a digital broadcast network to be used by the client-side software. The data is used to provide a user-experience through the client software associated with the datacast service. The delivery method of the data is similar to that used by traditional linear services such as video and audio signals. Subsequently, all information is provided in a "first to last" stream that materially influences the responsiveness of the user-experience. Additionally, the bandwidth limitations found within a digital broadcast network materially impacts the depth and sophistication of the user experience offered by many datacast services.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with scheduling updates for non-critical (e.g., not time-sensitive) data. The data (e.g., updates) is separated according to time-sensitivity and delivered to the user device when the device is idle, rather than listening to a broadcast channel for all data. This process delivery can be scheduled based on predetermined information provided to the client device. Intelligent client software includes functionality that automatically initiates a background process, which can open a broadcast connection and receive data (e.g., updates) over the digital broadcast network. Data deliveries made while the user is actively using the application only include time-sensitive data.

An aspect relates to a method for transmitting scheduled downloads. The method includes notifying a plurality of client devices of a forthcoming update and transmitting the update at a scheduled time. The forthcoming update can comprise non-time-sensitive data. A time-sensitive update can be transmitted at substantially the same time as it is available.

In accordance with another aspect, is a device for transmitting content. The device can include a computer platform having a memory and a processor, wherein the memory stores information related to decisions made by the processor. Also included in device can be a scheduler that schedules at least one non-time-sensitive update and an update notifier that informs a plurality of client devices of the proposed schedule. A monitor can also be included in the device. The monitor can review the proposed schedule and trigger a sender to transmit the at least one non-time-sensitive update at an appropriate time.

According to another aspect is an apparatus for selectively transmitting a scheduled download. The apparatus includes a means for notifying a plurality of receiving devices of a forthcoming update and a means for transmitting the forthcoming update at a scheduled time. The forthcoming update can comprise non-time-sensitive data. Also included can be a means for transmitting a time-sensitive update at substantially the same time it is available.

Still another aspect relates to a machine-readable medium having stored thereon machine-executable instructions for scheduling at least one non-time-sensitive update and informing a plurality of client devices of the proposed schedule. The machine-executable instructions can also include reviewing the proposed schedule and transmitting the at least one non-time-sensitive update at the appropriate time.

In a wireless communication system, another aspect relates to an apparatus comprising a processor. The processor can be configured to notify a plurality of clients of a forthcoming update and to transmit the update at a scheduled time.

In a related aspect is a method for receiving a scheduled download. The method includes receiving a notification of a scheduled update and tuning in at the scheduled time to receive the update. The scheduled update can comprise non-time-sensitive data. The update can be received in a broadcast connection.

Another aspect relates to a wireless communications apparatus comprising a computer platform having a memory and a processor, wherein the memory stores information related to decisions made by the processor. Also included in apparatus can be an update verifier that determines whether a scheduled update is appropriate for the wireless communications apparatus and a schedule handler that monitors a current time and compares a scheduled time for the update with the current time. The apparatus further can include an update acceptor that initiates a background process to receive the scheduled update.

Yet another aspect relates to an apparatus for selectively receiving a scheduled download. The apparatus includes a means for receiving a notification of a scheduled update and a means for tuning in at the scheduled time to receive the update. The scheduled update can comprise non-time-sensitive data.

A further aspect relates to a machine-readable medium having stored thereon machine-executable instructions for determining whether a scheduled update is appropriate. The machine-executable instructions also include monitoring a current time and comparing a scheduled time for the update with the current time and initiating a background process to receive the scheduled update.

In a wireless communication system, another aspect relates to an apparatus comprising a processor. The processor can be configured to receive a notification of a scheduled update and tune in at the scheduled time to receive the update. The processor can also be configured to automatically initiate a background functionality and download the scheduled update outside a primary application.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the

DETAILED DESCRIPTION

Figure 1:
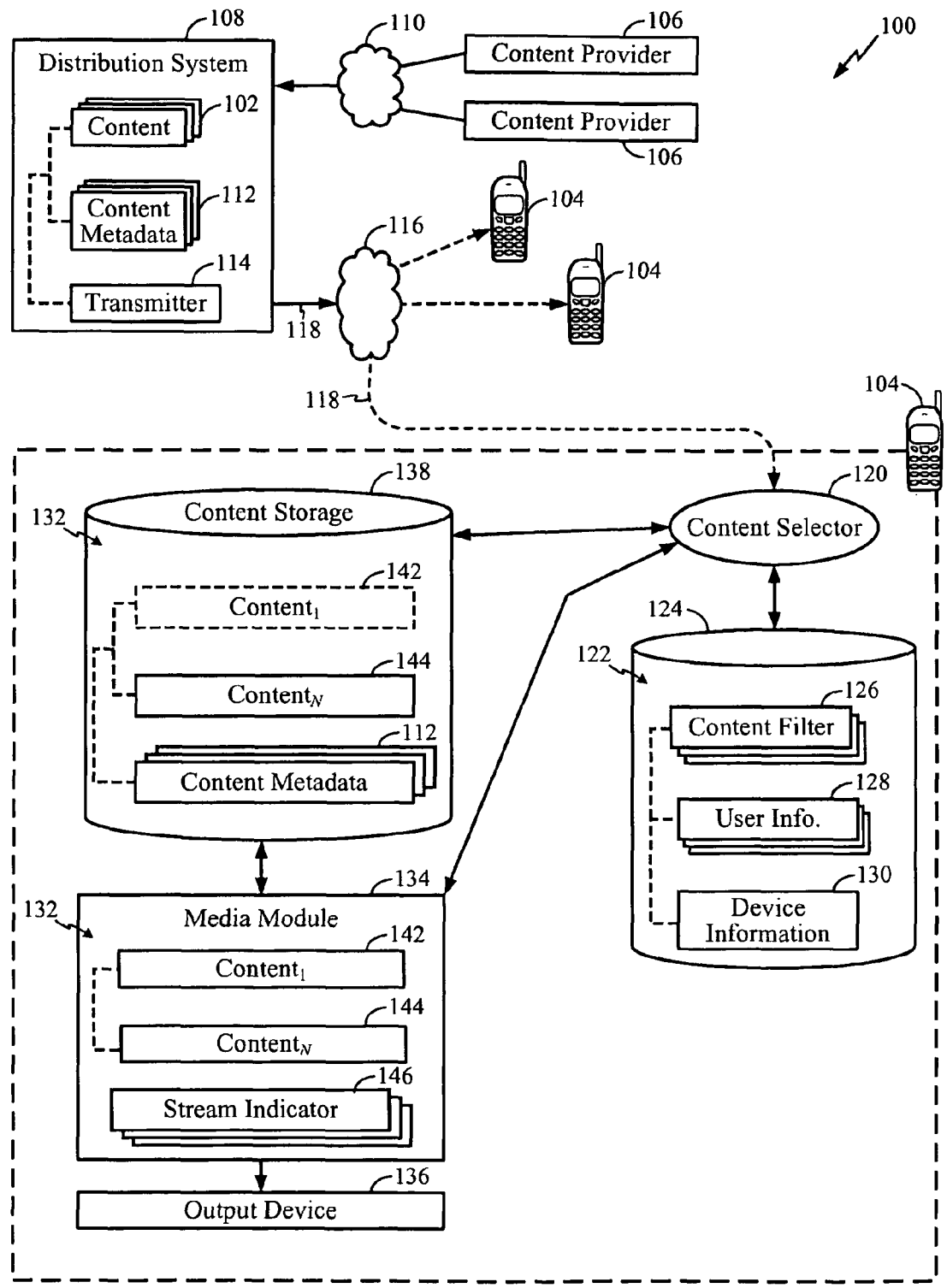
FIG. 1 illustrates a system that enables selective delivery and selective acceptance of content, which can include scheduled downloads.

Various embodiments are now described with reference to the drawings. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, client, client device, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, or modules and/or may not include all of the devices, components, or modules discussed in connection with the figures. A combination of these approaches may also be used.

Referring to FIG. 1, illustrated is a system 100 that enables selective delivery and selective acceptance of content 102, which can include scheduled downloads, on one or more wireless devices 104. Upon reviewing data required to be delivered to the client (e.g., updates), certain amounts of data can be classified as either time-sensitive (e.g., critical) or non-time-sensitive (e.g., not critical). However, a broadcast network cannot determine the current state of individual client applications. Therefore, the only way to ensure that all clients have the same data and databases is to repeatedly send the information, including the non-time-sensitive data. However, if this data is transmitted in a broadcast (e.g., first to last) environment and a multitude of clients are listening at a same time, there is a tremendous amount of bandwidth needed. This creates a highly inefficient system. Thus, system 100 can provide selective delivery and selective acceptance of content.

System 100 may include one or more content providers 106 operable to provide one more pieces of content 102 to distribution system 108, such as through a first network 110. Distribution system 108 is operable to deliver one or more sets of content 102, along with one or more content metadata 112 associated with each set of content 102, to the one or more wireless devices 104. For example, distribution system 108 may include a transmitter 114 and/or a second network 116, wherein transmitter 114 is operable to generate a one-to-many transmission 118 of content 102 and/or content metadata 112 for delivery to one or more wireless devices 104 through second network 116.

One or more sets of content 102 can be distributed based on a scheduled download. For example, a set of content 102 can be an update intended for the one or more wireless devices 104. The update can include time-sensitive data or non-time-sensitive data. Connections for time-sensitive data can be made while a user is actively using an application on the wireless devices 104. Connections for non-time-sensitive data can be automatically opened through background functionality that can operate when a device is idle or is using less resources than a threshold level.

For example, distribution system 108 might not know the last time a wireless device tuned in; it could have been yesterday or three weeks ago. Databases that include various types of information (e.g., stock information, company names, sports information, player names, and so forth) could have been updated. Instead of repeatedly sending the updates, such non-critical changes can be scheduled for downloading when it is convenient for the wireless device. When the wireless device is idle or during periods of low activity, it can automatically, without user intervention, turn on a background process, accept a stream being broadcast and download the broadcast data, which might contain a large database file. The broadcast can be sent once, a few times a day, over the course of a few days, or at other intervals to allow wireless devices adequate time to receive the data. The wireless devices can use the received data at substantially the same time as live and changing data streams. This allows the data that is not changing frequently to be placed in the large scheduled package file.

Upon accessing transmission 118, each wireless device 104 is operable to execute a content selector 120, which can be configured to identify content 102 in transmission 118 to download to wireless device 104 based on one or more selection parameters 122 within a selection database 124. Selection parameters 122 may include, but are not limited to, data such as one or more content filters 126 (e.g., scheduled downloads, time-sensitive updates, and so forth), one or more data representing user information 128 (e.g., preferences), and/or one or more data representing device information 130 (e.g., state of the device, such as active, inactive, idle, low resource consumption, and so forth.). Selection parameters 122 can be unique to, and/or customized for, each respective wireless device 104 and/or each respective user of each wireless device 104. As such, in some aspects, each wireless device 104 may download a different set of content 102 within the same transmission 118. Thus, in some aspects, one or more selection parameters 122 allow content selector 120 to download one or more selected content 132 of interest to a respective user of the respective wireless device 104 based on a match between one or more of the respective content metadata 112 and one or more of the selection parameters 122.

Further, for example, in aspects where selected content 132 comprises real time or live content, content selector 120 may forward selected content 132 to a media module 134 for presentation through an output device 136. In other aspects, for example, where selected content 132 comprises non-real-time content, content selector 120 may forward selected content 132 to be cached or saved in a content storage 138. In the non-real-time case, media module 134 is operable to access content storage 138 to retrieve and cause a presentation through output device 136 of the saved content 132.

Output device 136, in combination with media module 134, is operable to generate selected content 132 as a program or presentation for consumption by a user of wireless device 104. Each program or presentation may comprise a combination of one or more pieces of selected content 132 (labeled Content$_1$ 142 through Content$_N$ 144). The selected content 142, 144 can be associated with one more of the content metadata 112 corresponding to each selected content 142, 144.

In accordance with a related aspect, the content 102, which can be a scheduled download, can be delivered on a different channel than other content, such as an application that can be divided into two or more channels. The channel that the scheduled download will be sent on can be conveyed to the wireless devices 104 at substantially the same time as the notification of the download schedule is sent. In accordance with some aspects, the channel that contains the scheduled download contains metadata or another indicator that identifies the content contained therein as the scheduled download. Thus, wireless devices 104 can selectively accept the download by utilizing background functionality as discussed herein.

In accordance with some aspects, first network 110 and second network 116 provide respective communication links between the various components and/or entities of system 100. In some aspects, first network 110 and second network 116 may comprise independent networks, while in other aspects they may comprise inter-related networks. Generally, first network 110 and second network 116 each may comprise any one or any combination of one or more data networks and/or one or more communications networks. For example, in some aspects, first network 110 may comprise a public communications network, such as the Internet, and second network 116 may comprise a subscription based one-to-many network, such as a multicast network such as a Forward Link Only (FLO) network, including the Media-FLO™ System available from QUALCOMM Incorporated, of San Diego, Calif. In other aspects, first network 110 and second network 116 may include one or a combination of other networks, such as: a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared. Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio network.

Further, examples of telephone networks that may be included in some aspects of first network 110 and/or second network 116 include one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1×) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 2:
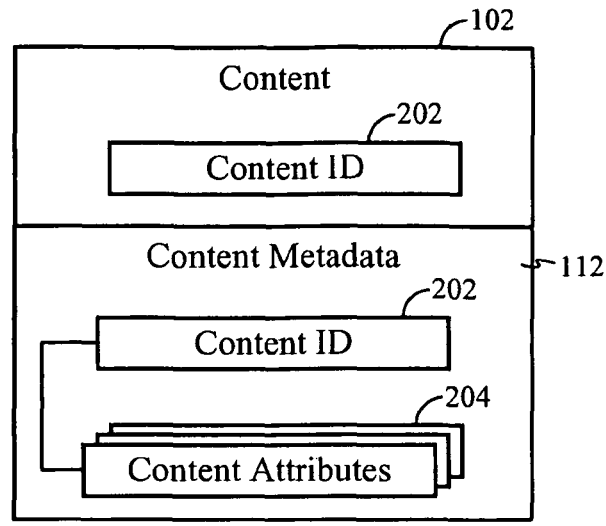
FIG. 2 illustrates a schematic diagram of an aspect of the content of FIG. 1.

Referring to FIG. 2, illustrated is a schematic diagram of an aspect of the content of FIG. 1. Content 102 as used herein may comprise, but is not limited to, at least one of video, audio, multimedia content, real-time content, non-real-time content also referred to as "clips," scripts, programs, scheduled downloads, updates (both time-sensitive and non-time-sensitive) or any other type of data or object operable to be distributed to and executed or presented by wireless device 104. For example, content 102 may include one or any combination of subscribed to programming, ad hoc and/or on-demand received programming, and/or advertising or any other form of content added to, inserted within and/or presented simultaneously with or in place of other content. Additionally, for example, content 102 may comprise, but is not limited to, a television show, a video, a movie, a song, interactive data such as World Wide Web pages and links, etc. Further, content 102 may comprise a unique content identifier (ID) 202, such as one or any combination of a letter, a number, a name, a file name, a file path, etc. associated with the respective piece of content.

Additionally, at least one of the multitude of content 102 is associated with one or more content metadata 112. For instance, one or more of the "content suppliers" associated with a respective one of the multitude of content 102 may define the respective content metadata 112, and associate the content metadata 112 with the respective content. As used herein, the term "content supplier" may include one or any combination of a content provider such as content provider 106, a content retailer, a billing and customer service provider, and a media distributor such as distribution system 108. Content metadata 112 comprises any data that describes and/or is associated with each respective piece of content 102. For example, content metadata 112 may comprise, but is not limited to, one or any combination of content ID 202 and one or more content attributes 204, such as a category, a name, a content length, a content type, associated stream indicator 146, a code, an identifier, a theme, a genre, an intended audience and/or market, a script, a content filter identifier, a cuing protocol parameter, a related audience and/or market, and/or any metadata relating to the corresponding content. One or more content metadata 112 may be separate from, attached to or embedded within the respective content 102. In some aspects, for example, when content 102 and content metadata 112 are separate, they each may comprise or point to the same content ID 202, for example, to enable the respective content metadata to be related to the respective content.

Figure 3:
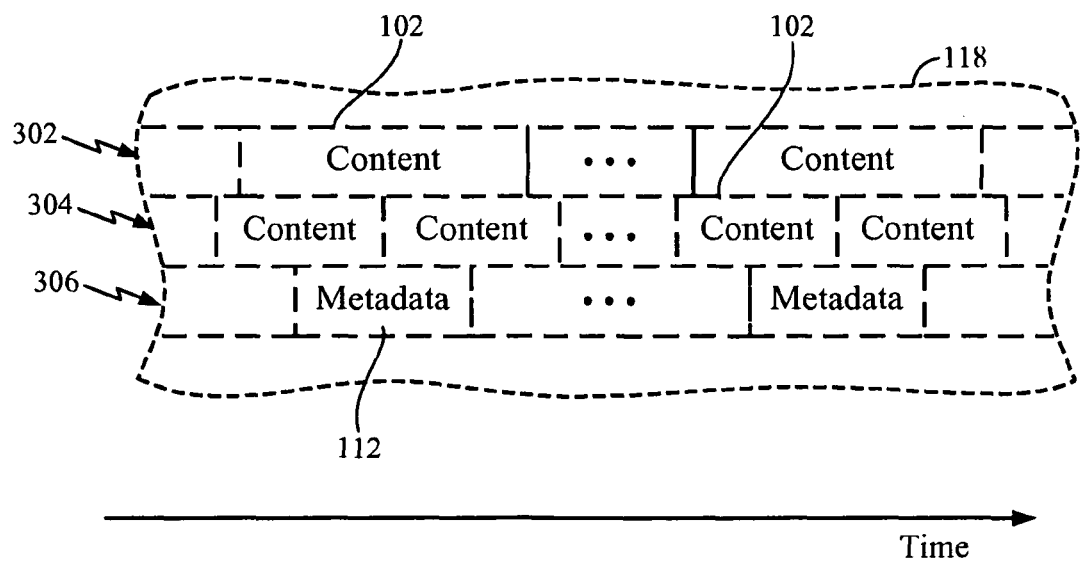
FIG. 3 illustrates a schematic diagram of an aspect of the transmission of a multitude of streams of the multitude of content of FIG. 1.

Referring to FIG. 3, illustrated is a schematic diagram of an aspect of the transmission of a multitude of streams of the multitude of content of FIG. 1. Transmission 118 may provide one or more channels or services 302, 304, 306 of content 102 and content metadata 112 to each wireless device 104 (FIG. 1) for consumption by a respective end user. In some aspects, for example, each transmission 118 may comprise a one-to-many transmission in a Forward Link Only (FLO™) system, such as the MediaFLO™ system available from QUALCOMM Incorporated of San Diego, Calif. In such a system, transmission 118 comprises a flow or a logical stream within a "multiplex," which is a set of flows available in a given geographical area. Further, each channel, service, and/or stream 302, 304, 306 carried by transmission 118 can include scheduled download information that can be broadcast at predetermined times. During times when the scheduled download is not being broadcast, the particular channel used to broadcast the download can be used to supply other information to the wireless devices 104.

Figure 4:
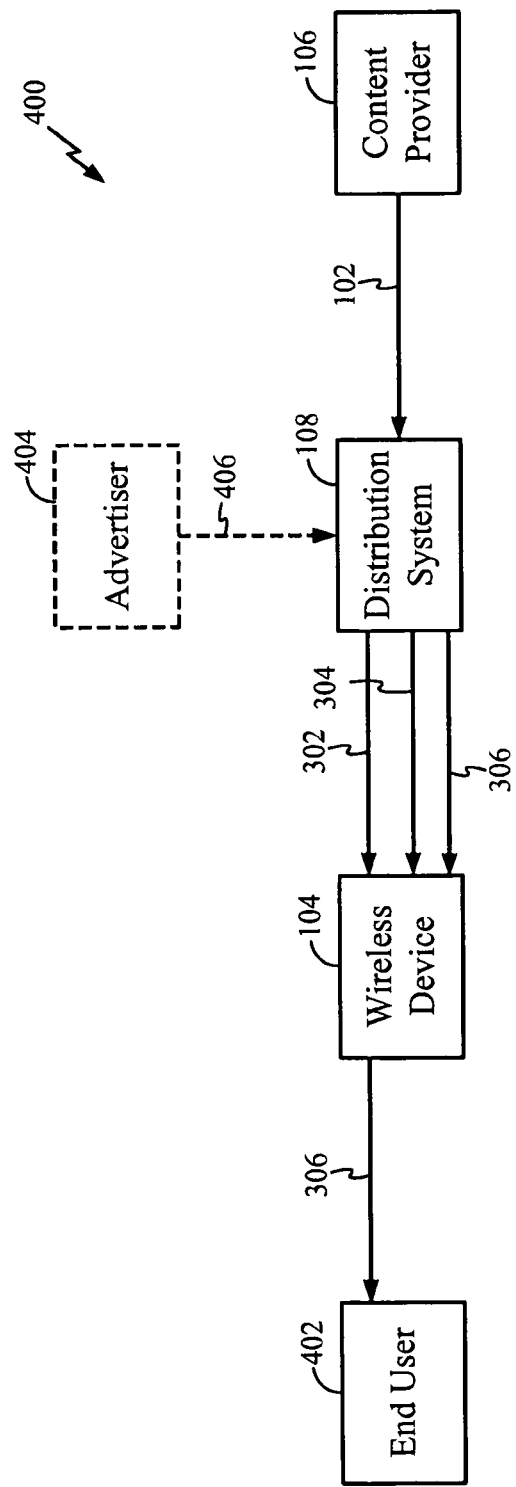
FIG. 4 illustrates a schematic diagram of an aspect of components, including an advertiser, of the system of FIG. 1.

Referring to FIG. 4, illustrated is a schematic diagram of an aspect of components, including an advertiser, of the system of FIG. 1. In some aspects, because the presentation of each service, channel and/or stream 302, 304, 306 (hereinafter referred to as channel) carried by transmission 118 may attract a large number of end users or consumers 402, system 100 may further include one or more advertisers 404 in communication with distribution system 108. Advertiser 404 comprises an entity desiring to present one more pieces of content 102 (FIG. 1) within a channel 406, in the form of one or more advertisements to selected end users 402. For example, in this aspect, a first channel 302 may comprise, but is not limited to, an advertisement.

Figure 5:
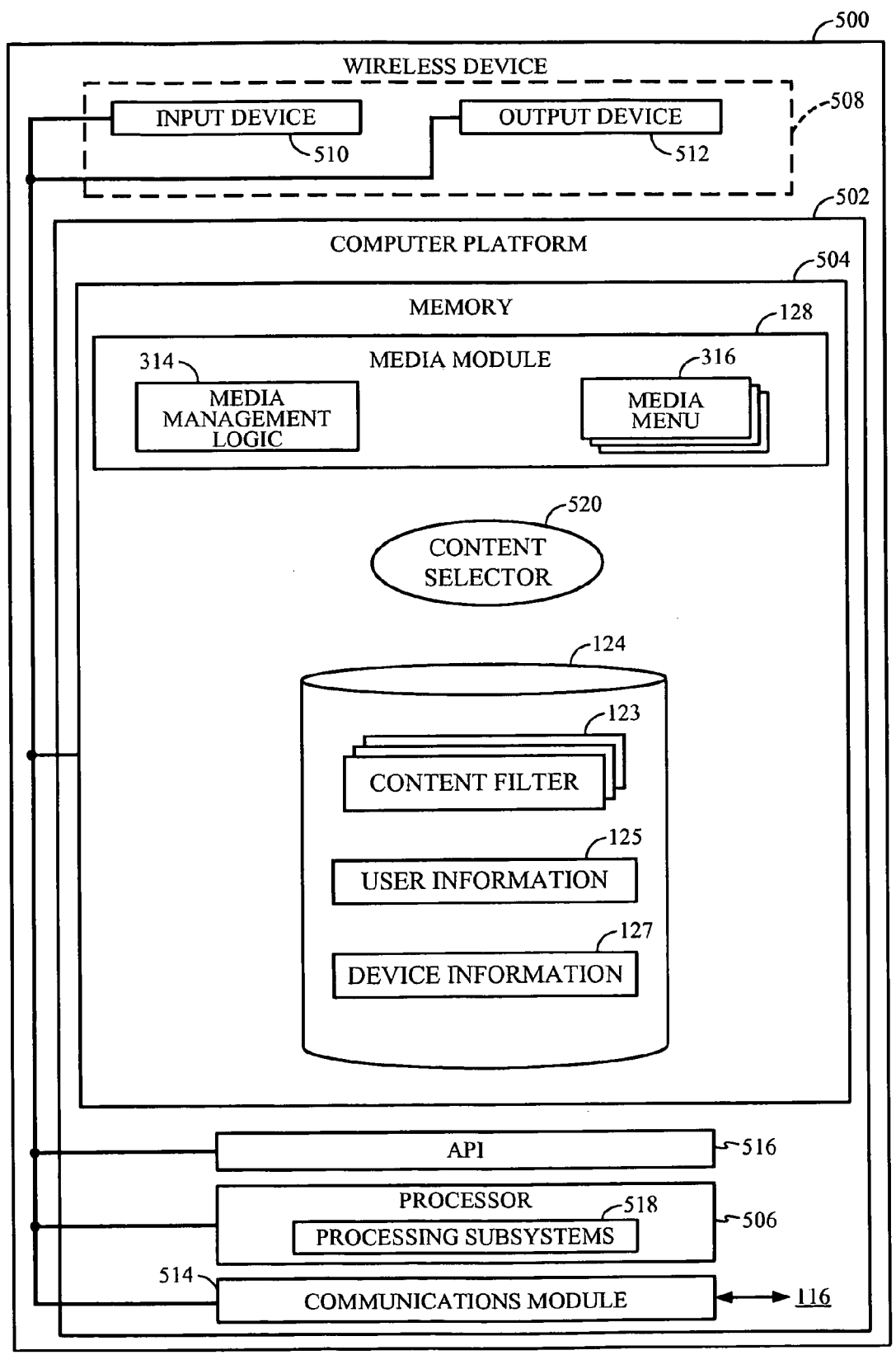
FIG. 5 illustrates a wireless device in accordance with the disclosed aspects.

FIG. 5 illustrates a wireless device 500 in accordance with the disclosed aspects. Wireless device 500 represents wireless device 104 of system 100 (FIG. 1) and is operable to access second network 116 in order to receive transmission 118 and/or to communicate with distribution system 108. Each wireless device 500 may comprise a computer platform 502 having a memory 504 operable to store data, logic and applications executable by a processor 506. A user may interact with wireless device 500 and its resident applications through one or more user interfaces 508, which may include one or more input devices 510 and one or more output devices 512. Additionally, wireless device 500 may exchange communications with external devices and/or networks through a communications module 514.

It should be noted that although wireless devices 500 may be illustrated as cellular telephones, any number and combination of types of wireless devices 500 may be included in system 100 of FIG. 1. For example, wireless device 500 may include, but is not limited to, a cellular telephone, a Personal Digital Assistant (PDA) a laptop computer, a two-way pager, a portable gaming device, a portable music device, or any type of computerized, wireless device. The disclosed aspects can accordingly be performed on any form of wireless device or computer module, including a wired or wireless communication portal, including without limitation, wireless modems, PCMCIA cards, access terminals, personal computers, telephones, or any combination or sub-combination thereof.

Computer platform 502 is operable to transmit data across a network, such as first network 110 (FIG. 1) and/or second network 116 (FIG. 1), and is operable to receive and execute routines and applications and optionally display data generated within wireless device 500 or received from any network device or other computer device connected to the network or connected to wireless device 500. Computer platform 502 may be embodied in, for example, one or any combination of hardware, firmware, software, data and executable instructions.

Memory 504 may comprise one or any combination of volatile and nonvolatile memory, such as read-only and/or random-access memory (RAM and ROM), EPROM, EEPROM, flash cards, flash memory cells, an electronic file system, and any memory common to computer platforms. Further, memory 504 may include one or more of any secondary or tertiary storage device, such as magnetic media, optical media, tape, or soft or hard disk, including removable memory mechanisms.

Further, processor 502 may be one or more of an application-specific integrated circuit ("ASIC"), a chipset, a processor, a logic circuit, and any other data processing device. In some aspects, processor 504, or other processor such as an ASIC, may execute an application programming interface (API) layer 516 that interfaces with any resident programs stored in memory 504 of wireless device 500. API 516 is typically a runtime environment executing on the respective wireless device. One such runtime environment is Binary Runtime Environment for Wireless® (BREW®) software developed by QUALCOMM Incorporated, of San Diego, Calif. Other runtime environments may be utilized that, for example, operate to control the execution of applications on wireless computing devices.

Additionally, processor 502 may include various processing subsystems 518 embodied in hardware, firmware, software, data, executable instructions and combinations thereof, which enable the functionality of wireless device 500 and the operability of wireless device on network 116 of FIG. 1. For example, processing subsystems 518 allow for initiating and maintaining communications, and exchanging data, with distribution system 108 and/or other networked devices. In aspects in which the wireless device 500 is defined as a cellular telephone, for example, processor 506 may additionally include one or a combination of processing subsystems 518, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, vocoder, messaging, graphics, USB, multimedia, etc. For the disclosed aspects, processing subsystems 518 of processor 506 may include any subsystem components that interact with applications executing on computer platform 502 that enable the functionality described herein. For example, processing subsystems 518 may include any subsystem components that receive data reads and data writes from API 516 on behalf of content selector 520.

Further, communications module 514 may be embodied in hardware, firmware, software, data, executable instructions and combinations thereof, and is operable to enable communications among the various components of wireless device 500, as well as between wireless device 104 and first network 110 and/or second network 116. For example, in cellular telephone aspects, communication module 514 may include the requisite hardware, firmware, software, data, executable instructions and combinations thereof, including transmit and receive chain components for establishing a wireless communication connection.

Further, for example, communication module 514 is operable to receive the plurality of content 102, which can include a scheduled download, and the associated respective one or more content metadata 112, if any, from distribution system 108 and forward them to content selector 520 or provide content selector 520 with access to them. Similarly, for example, communication module 514 is operable to receive the one or more selection parameters 122 and either forward them to content selector 520 or provide content selector 520 with access to them. Subsequently, for example, communications module 514 is operable to forward the selected content 126, respectively, to other device components for further processing.

Additionally, one or more input devices 510 for generating inputs into wireless device, and one or more output devices 512 for generating information for consumption by the user of the wireless device are provided. For example, input device 510 may include a mechanism such as a key or keyboard, a navigation mechanism, a mouse, a touch-screen display, a microphone in association with a voice recognition module, etc. In certain aspects, input device 510 provides an interface for receiving user input, such as to activate or interact with an application or module on the wireless device. Further, for example, output device 512 may include a display, an audio speaker, a haptic feedback mechanism, etc. Further, user interface 508 may comprise one or any combination of input devices 510 and/or output devices 512.

Figure 6:
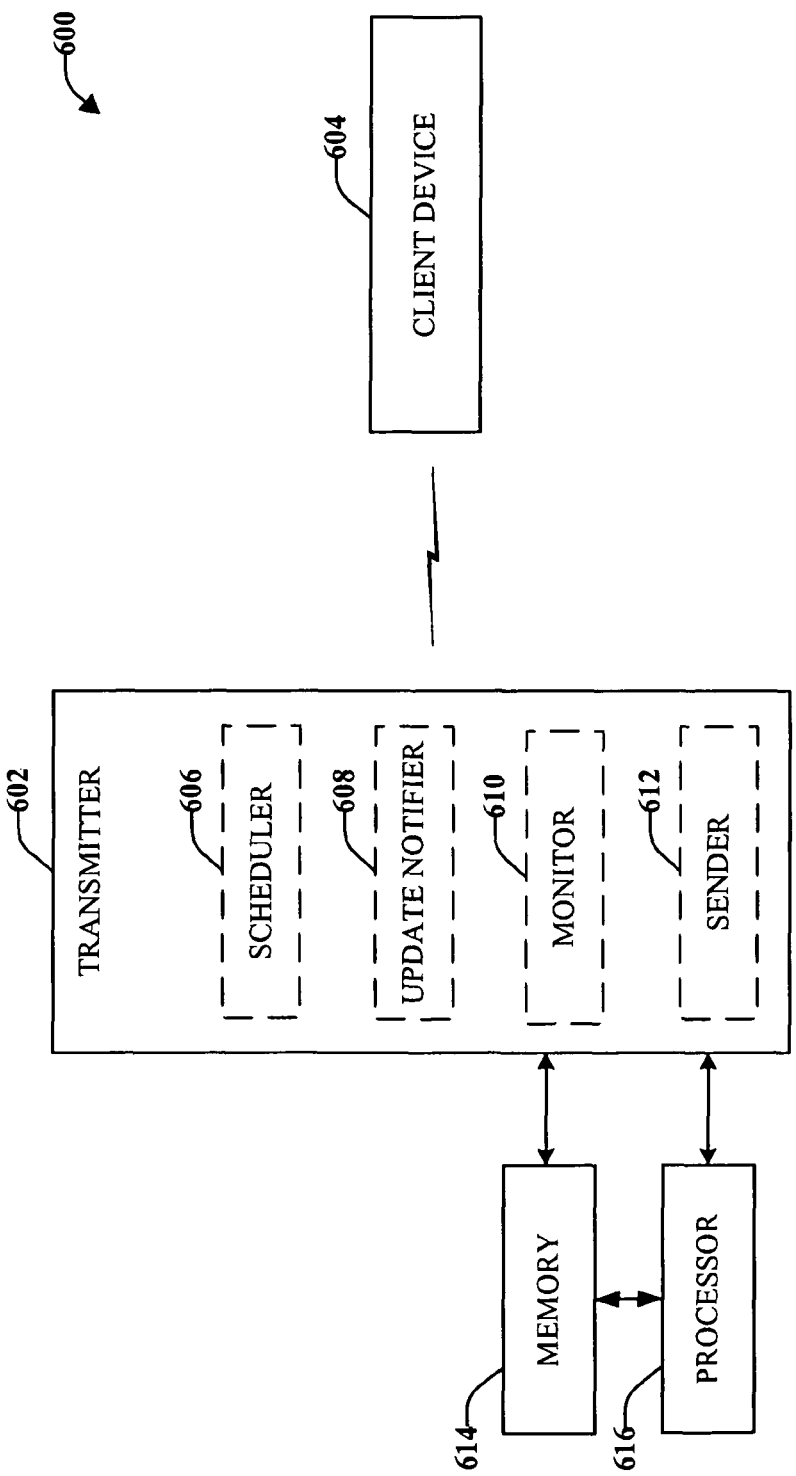
FIG. 6 illustrates a block diagram of an example system for broadcasting scheduled downloads.

With reference now to FIG. 6, illustrated is a block diagram of an example system 600 for broadcasting scheduled downloads. System 600 can be configured to allow non-critical data to be delivered to a client device when the client device is idle or is using less resources than a threshold level. The client device can initiate a background process and receive the data outside of a primary application. Other broadcast channels can be used when the client is active or resource consumption is higher than a threshold level, which can be utilized to deliver time-sensitive data. Thus, system 600 can provide a more robust client experience.

In further detail, system 600 includes a transmitter 602 that is in wireless communication with a client device 604. It should be understood that although multiple transmitters and multiple client devices can be included in system 600, only one of each is shown for simplicity. Transmitter 602 can be configured to notify client 604 of a scheduled (non-time-sensitive) download that is (or will be) available.

Transmitter 602 can include a scheduler 606 that can be configured to schedule such non-time-sensitive downloads. Such downloads can be planned for periods of low inactivity (e.g., during non-peak hours), at regular intervals (e.g., every three hours), at random intervals (e.g., 1:00 a.m., 7:00 a.m., 4:00 p.m., and 9:00 p.m.), or only scheduled for a single time (e.g., "This Wednesday at 6:30 p.m."). The schedule can also include a time window or update window that enables client devices 604 to access the download during a predetermined period (e.g., "Sunday between 5:30 p.m. and 11:45 p.m."). Additionally, the schedule can be over a series of days or weeks, which can be contiguous days/weeks or non-contiguous days/weeks (e.g., every other day, every third day).

Also included is an update notifier 608 that can be configured to notify client devices 604 of the proposed schedule. Such information can be sent continuously or at different intervals over the course of a few days, for example, so that client devices 604 that need to be aware of the schedule have adequate time to receive the scheduling information.

A monitor 610 can be configured to review the schedule for the download and send a triggering signal to a sender 612, which can be a transmitter or transmitter/receiver pair, at the appropriate time. Monitor 610 can compare the scheduled time for the downloads with a current time. The current time can be the time referenced by transmitter 602 (e.g., the current time of transmitter 602) or it can be the time reference by client device 604 (e.g., the current time associated with client device 604). For example, a client located in the Eastern Time Zone can receive the update approximately three hours earlier than a client located in the Pacific Time Zone.

In accordance with some aspects, the various times zones are synchronized, such that a client in the Eastern Time Zone receives a schedule indicating that the broadcast will begin at 3:00 a.m. on Saturday and a client on the Pacific Time Zone receives a scheduling indicating that the broadcast will begin at 12:00 a.m. on Saturday. In this scenario, client device can include functionality that can monitor movement of the client. For example, client device might be operating within the Eastern Time Zone and is turned "off", such as when boarding an airplane. Then, when the client is turned "on" after the plane has landed, it is now operating within the Pacific Time Zone. Client device 604 can include functionality that interprets the change (e.g., by monitoring the relevant area or location) and automatically adjusts device timing so that it tunes into the broadcast at the proper time (e.g., Pacific Time Zone instead of Eastern Time Zone).

Sender 612 can further be configured to broadcast the scheduled download on a dedicated channel or data stream. This dedicated channel can be utilized for the download during the scheduled download times. During other times, when the download is not scheduled, the dedicated channel can be utilized to send other broadcast data.

System 600 can include memory 614 operatively coupled to transmitter 602. Memory 614 can store information related to data that should be sent as a scheduled download, scheduled download times, and other information generated by the processor. In accordance with some aspects, memory 614 can store information related to devices that received a scheduled download and other suitable information related to scheduling and transmitting downloads in a communication network. A processor 616 can be operatively connected to transmitter 602 (and/or memory 614) to execute instructions relating to scheduling and transmitting downloads to receiving devices.

In accordance with some aspects, processor 616 can execute instructions relating to determining a best time or times to broadcast download data in a communication network. Processor 616 can execute instructions for recommending download times or update windows, notifying receiving devices of when to expect the forthcoming update, transmitting the update at the scheduled time(s), and so forth. Processor 616 can execute instructions, in accordance with some aspects, for retransmitting an update if there was an error during the scheduled transmissions.

Processor 616 can be a processor dedicated to scheduling and/or broadcasting non-time-sensitive data. Processor 616 can also be a processor that controls a retransmission to a client based upon a dedicated request and/or a processor that both analyzes and generates information received by transmitter 602 and controls one or more components of system 600.

Memory 614 can store protocols associated with scheduled times for updates, taking action to control communication between transmitter 602 and client device 604, etc., such that system 600 can employ stored protocols and/or algorithms to achieve broadcasting scheduled downloads in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 414 of the disclosed embodiments are intended to comprise, without being limited to, these and other suitable types of memory.

Figure 7:
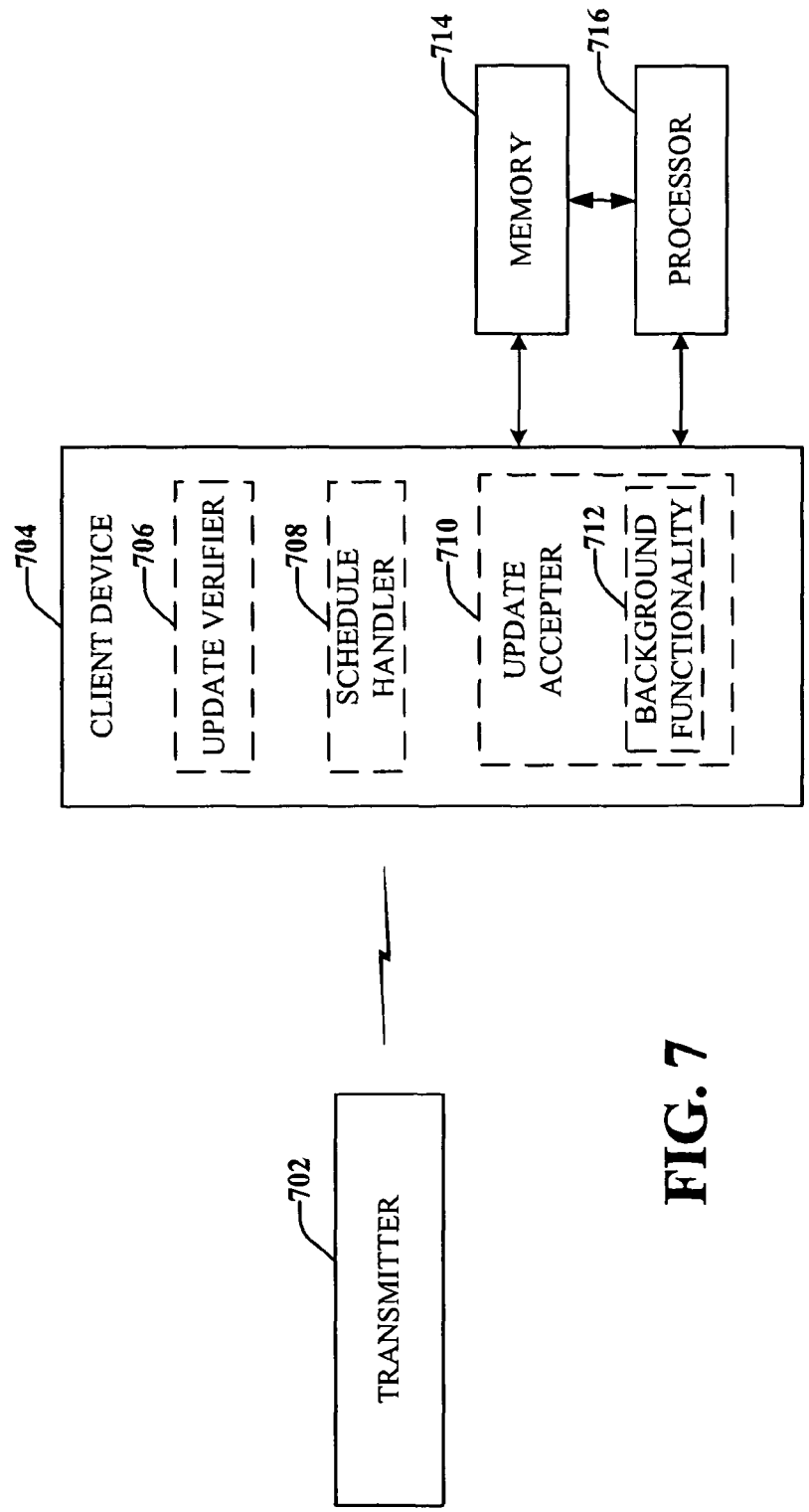
FIG. 7 illustrates an example system for selectively receiving a scheduled download.

FIG. 7 illustrates an example system 700 for selectively receiving a scheduled download. System 700 can be configured to allow non-critical data to be delivered to a user device when the device is idle or is using a low amount of resources. A background process can be initiated by the device for receiving data outside the primary application. Thus, other broadcast channels can be utilized when the device is active and can be better purposed to deliver time-sensitive data.

System 700 is similar to the system 600 of the above figure and includes a transmitter 702 that is in wireless communication with a client device 704. Transmitter 702 can schedule various non-critical downloads. An update verifier 706 can be configured to verify whether the data scheduled to be broadcast is appropriate for client device 704 and/or whether the data has already been received. For example, non-critical data might be broadcast at different intervals over the course of a few days. There might be more than one time when client device 704 is not busy. If the data was received during an earlier broadcast, update verifier 706 can selectively disregard the broadcast. If, however, the earlier broadcast data was not received, did not complete, or there was a problem with receiving the data, update verifier 706 can accept the broadcast data.

In accordance with some aspects, update verifier 706 can be configured to selectively accept a scheduled download based on a particular channel that the data is sent over. The channel can be pre-determined and information relating to the channel can be sent at substantially the same time as the notification of the scheduled download is received. Alternatively, the channel might not be pre-determined and information received in conjunction with the data can notify client device 704 and/or update verifier 708 that the channel contains the scheduled download. Connections for time-sensitive data can be made while a user is actively using an application on the client 704 or at any other time.

If the scheduled broadcast is appropriate for client 704, a schedule handler 708 can be configured to monitor scheduled time(s) or an update window relating to when various non-critical updates are expected to be broadcast (e.g., client 704 does not have to listen for the update except during scheduled times). Schedule handler 708 can be configured to monitor a current time associated with client 704. In accordance with some aspects, schedule handler 708 can monitor changes in the time zone of client 704 (e.g., a change from Pacific Time Zone to Eastern Time Zone).

Schedule handler 708 can further compare the scheduled time with the current time and, if there is a match, update acceptor 710 can be notified to selectively accept the download. Update acceptor 710 can include background functionality 712 that can be configured to initiate a background process to receive data and manage the non-critical data when the client device 704 is idle or during periods of low power consumption. If the client device 704 is busy, background functionality 712 can selectively disregard the current broadcast of the non-critical data and accept or request the update at a different time.

System 700 can include memory 714 operatively coupled to client 704. Memory 714 can store information related to notification of scheduled times that an update will be broadcast. The scheduled broadcast can included non-time-sensitive data. In accordance with some aspects, memory 714 can store information related to historical downloads (e.g., how often an update is received for a particular application, the last time an update was received) and other suitable information related to receiving scheduled download data in a communication network. A processor 716 can be operatively connected to client 702 (and/or memory 714) to execute instructions relating to receiving a scheduled forthcoming update.

In accordance with some aspects, processor 716 can execute instructions relating to analysis of information related to the scheduled download. Processor 716 can execute instructions for selectively determining a best time to accept the update, automatically initiating a background functionality for receiving the update, and so forth. Processor 716 can execute instructions, in accordance with some aspects, for automatically requesting a dedicated update over an alternate communication link if the scheduled update was not received. Processor 716 can be a processor dedicated to analyzing and/or generating information received by client device 704 (e.g., download information, location of user devices, downloads to be communicated to user devices, and so forth). Processor 716 can also be a processor that controls one or more components of system 700, and/or a processor that both analyzes and generates information received by client device 704 and controls one or more components of system 700.

Figure 8:
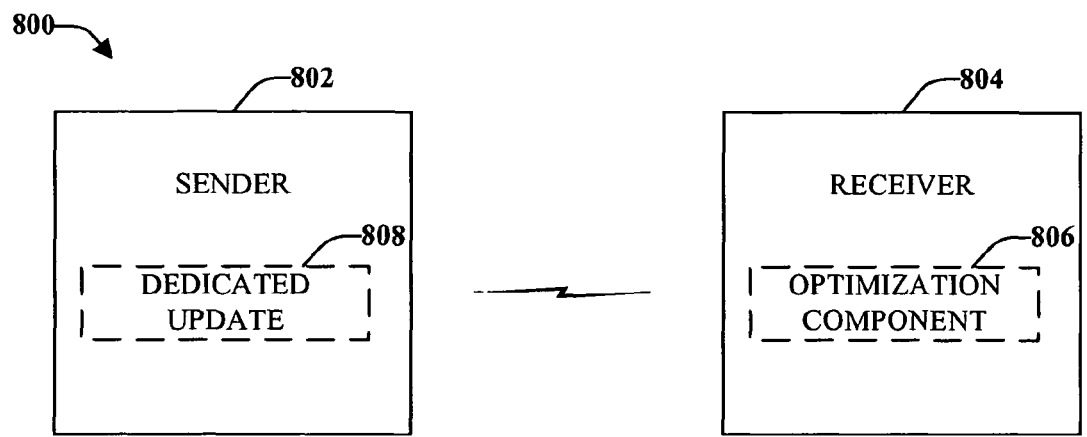
FIG. 8 illustrates a system that selectively transmits and receives a dedicated update when a scheduled broadcast is not available.

FIG. 8 illustrates a system 800 that selectively transmits and receives a dedicated update when a scheduled broadcast is not available. There might be situations when a user device cannot receive a scheduled broadcast due to various conditions and factors. For example, the client device might be out of range of the broadcast signal (e.g., out of the country, the device's battery does not have an adequate charge). In these situations, a dedicated update can be sent to the device upon request.

In more detail, system 800 includes a sender 802 that is in wireless communication with one or more receivers 804 (of which only one is illustrated). The sender 802 might have already broadcast a scheduled update, which was received by a high percentage of receivers 804. However, there might be a number of receivers 804 that, for various reasons, did not have the opportunity to download the scheduled data.

Receiver 804 can include an optimization component 806 that can be configured to determine whether a scheduled download was missed due to various factors. Optimization component 806 can make the determination by accessing retained information and determining whether the scheduled time(s) has expired (e.g., by requesting information from scheduled handler 708 of FIG. 7). In accordance with some aspects, receiver 804 might not be aware that there was a scheduled update. In this situation, optimization component 806 can be configured to selectively request information relating to downloads that might have been missed. For example, there might be common types of data that are updated periodically. Optimization component 806 can determine such needed updates based on information contained within the application that utilizes the update, based on historical data (e.g., an update is generally received for a particular application every two months and it is beyond the two month window), or based on other criteria (e.g., information in a particular application is outdate, included an expiration date, and so forth).

If optimization component 806 determines that a scheduled download was potentially missed, it can transmit a request to sender 802 asking about the update. If it is unclear whether there was a scheduled download, the request can include whether there was an update. The request can also include information relating to the last update received (e.g., time stamp of the data or other identifying information). If there was a missed update, a dedicated update 808 can be unicast to receiver 804 in reply to the request. In such a manner, system 800 can allow receivers 804 that missed the scheduled download to receive the download after expiration of the schedule.

Figure 9:
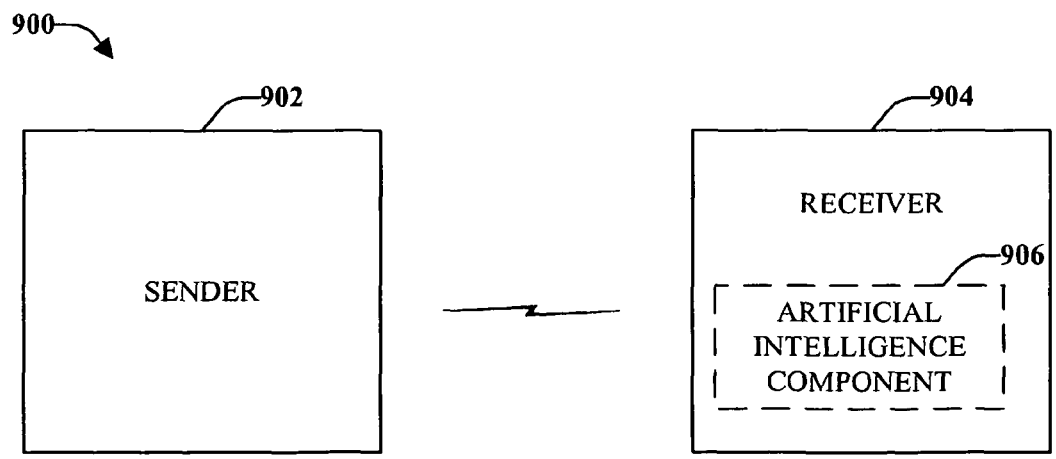
FIG. 9 illustrates an example system that utilizes artificial intelligence to automate one or more of the disclosed aspects.

FIG. 9 illustrates an example system 900 that utilizes artificial intelligence to automate one or more of the disclosed aspects. System 900 can facilitate automatic acceptance of scheduled downloads during a period of lower device activity through a background functionality process. Accepting non-critical downloads during minimal use of a device can provide a more robust user experience by allowing the update to have little, if any, interference with active applications. Critical updates can be sent and received at any time.

In further detail, system 900 includes a sender 902 that can be configured to schedule non-critical downloads and notify one or more receivers 904 as to the availability of the downloads. Receiver 904 can employ artificial intelligence (AI) methods, which can be facilitated by AI component 906, as illustrated. The various embodiments (in connection with selectively receiving scheduled downloads) can employ various AI-based schemes (e.g., machine learning and reasoning, rules-based techniques) for carrying out various aspects thereof. For example, a process for determining if a scheduled download is appropriate for the device, determining a best time to accept the download during the available times, and so forth, can be facilitated through an automatic classifier system and process. For example, based on a user or device state AI component 906 can infer that it is an optimal time to receive the scheduled download.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (factoring into the analysis utilities and costs) to prognose or infer an action that a user desires to be automatically performed. In the case of accepting scheduled downloads, for example, attributes can be information included with the download (e.g., importance, relevance to user), and the classes are categories or areas of interest (e.g., user preferences or use of the data, relevance of the data, and so forth).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria, the order in which to receive downloads if more than one is available at a given time, whether a scheduled download was missed and should be requested, etc. The criteria can include, but is not limited to, the type of data included in each download, the content included in each download, device information, user preferences, and so forth.

Figure 10:
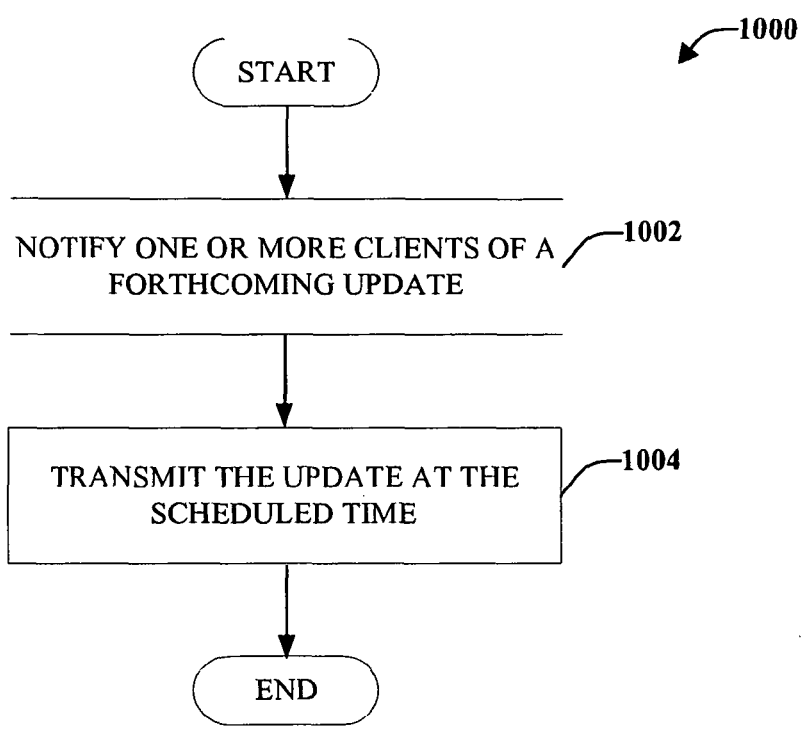
FIG. 10 illustrates a method for transmitting scheduled downloads.
Figure 11:
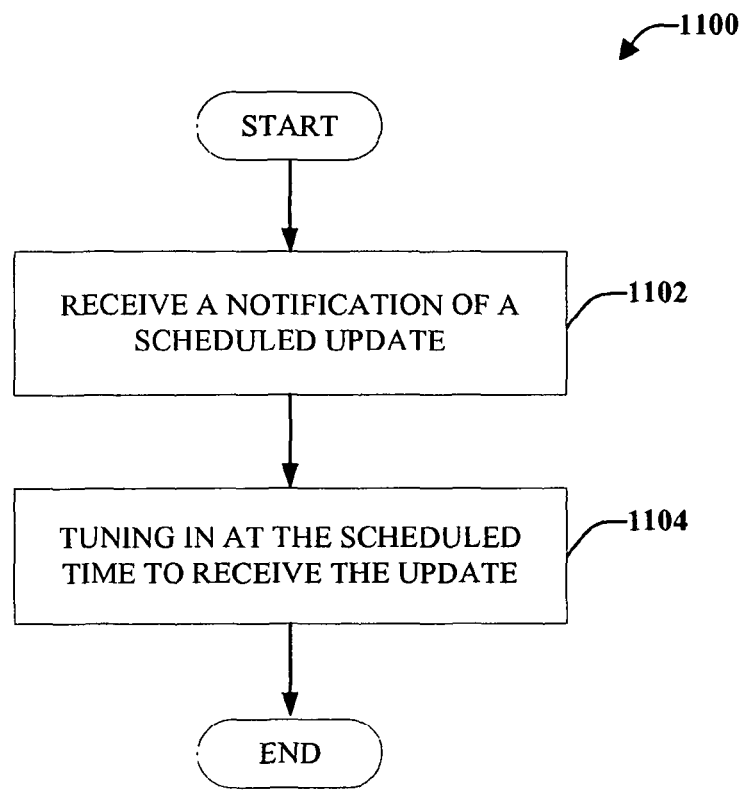
FIG. 11 illustrates a method for receiving a scheduled download.

In view of the exemplary systems shown and described above, methodologies that may be implemented in accordance with the disclosed subject matter, will be better appreciated with reference to the flow charts of FIGS. 10 and 11. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 10 illustrates a method 1000 for transmitting scheduled downloads. When there is information that should be delivered to a client device, such as updates, some of the information is critical, or time-sensitive, while other information is not critical or not time-sensitive. A broadcast network generally cannot determine a current status of any individual client. Thus, at any time, a user can be actively interacting with one or more client applications or the user might not be using the client device (an inactive status). Therefore, traditionally the way to make sure that all client devices have the same data and databases is to repeatedly send all the update information, whether it is time-sensitive or not. The continual communication of the update information is inefficient. Thus, method 1000 can facilitate scheduling non-time-sensitive data for downloading on a client device to enable the client device to accept the update during an idle or low activity period while allowing for time sensitive data to reach the device earlier than it would with a transmission including both types (sensitive and non-sensitive).

Method 1000 starts, at 1002, when a one or more clients (e.g., user device) is notified of a forthcoming non-critical update. The notification can include a schedule or time (e.g., 9:00 p.m. on Friday) that the update will be broadcast. The schedule might be an update window, such as between 11:00 p.m. on Saturday and 3:00 a.m. on Sunday. In accordance with some aspects, alternatives to the schedule can be included in the notification. These alternatives can indicate different times or intervals during which the information will be retransmitted. For example, a non-critical update can be scheduled to be broadcast three times a day for a week. This allows a client device to selectively choose at least one of the times during which to download the update. Thus, if the client is busy and not able to accept the download, or out of range (e.g., in a different country, in an area without good reception), or for some other reason misses one of the broadcasts, there is an opportunity to receive the broadcast at a later time.

At 1004, the update is transmitted at the scheduled time or times. As discussed above, the update information can be broadcast at different times in order for the receiving device to have the opportunity to receive and accept the update at an optimal time for the client device (e.g., during a period of inactivity). However, there might be situations when a client device does not receive the update during the scheduled times. If the client device has missed all scheduled times, a request can be received from the client device requesting a retransmission of the update. This retransmission, since it is beyond the broadcast scheduling, can be sent over a unicast connection rather than broadcast.

In accordance with some aspects, the non-critical updates can be broadcast over a channel that is separate from one or more other channels being broadcast. Thus, when a scheduled update is sent, a client device can identify the update based on the channel (e.g., the channel information can be sent at substantially the same time as the update notification). During periods when the update is not scheduled to be sent, other information can be broadcast on the channel, which allows for utilization of available resources. Thus, the channel utilized for the update might be a dedicated channel reserved for updates, however, this is not necessary (the channel does not have to be dedicated to the updates).

FIG. 11 illustrates a method 1100 for receiving a scheduled download. The scheduled download can include updates, which can be time-sensitive updates or non-time-sensitive updates. The time-sensitive updates can be sent and received at a client device in a real-time manner (e.g., downloaded on client device at substantially the same time as receipt). The non-time-sensitive updates can be received by launching a background process, which can provide an acceptable depth and delivery of a user experience.

Method 1100 starts, at 1102, when a notification of a scheduled update is received. This update can be received for non-critical updates that can be updated on a client device during a period of low activity. The notification can include a particular time or window during which the update will be broadcast or it can include multiple times or windows during which the update will be broadcast. The window should be long enough or multiple broadcasts should be broadcast for a long enough amount of time to allow the client device the opportunity to selectively receive the update.

At 1104, the client device tunes in at the scheduled time to receive the update. Tuning into the update can include initiating a background process automatically, without user interaction. A digital broadcast connection can be opened and the data received over the digital broadcast network.

Thus, method 1100 allows non-critical data to be delivered to the client device when the client device is in a low activity period. By initiating the background process and receiving data outside of the primary application, the other broadcast channels used when the client device is in a period of high activity can be better purposed to deliver time-sensitive data, which can provide a robust client experience.

If a scheduled download is not received and the scheduled download period(s) has expired, a request can automatically be sent asking that the download be made available. If appropriate, the download can be transmitted to the requesting device through a unicast connection to allow client device to receive and apply the updated information.

Figure 12:
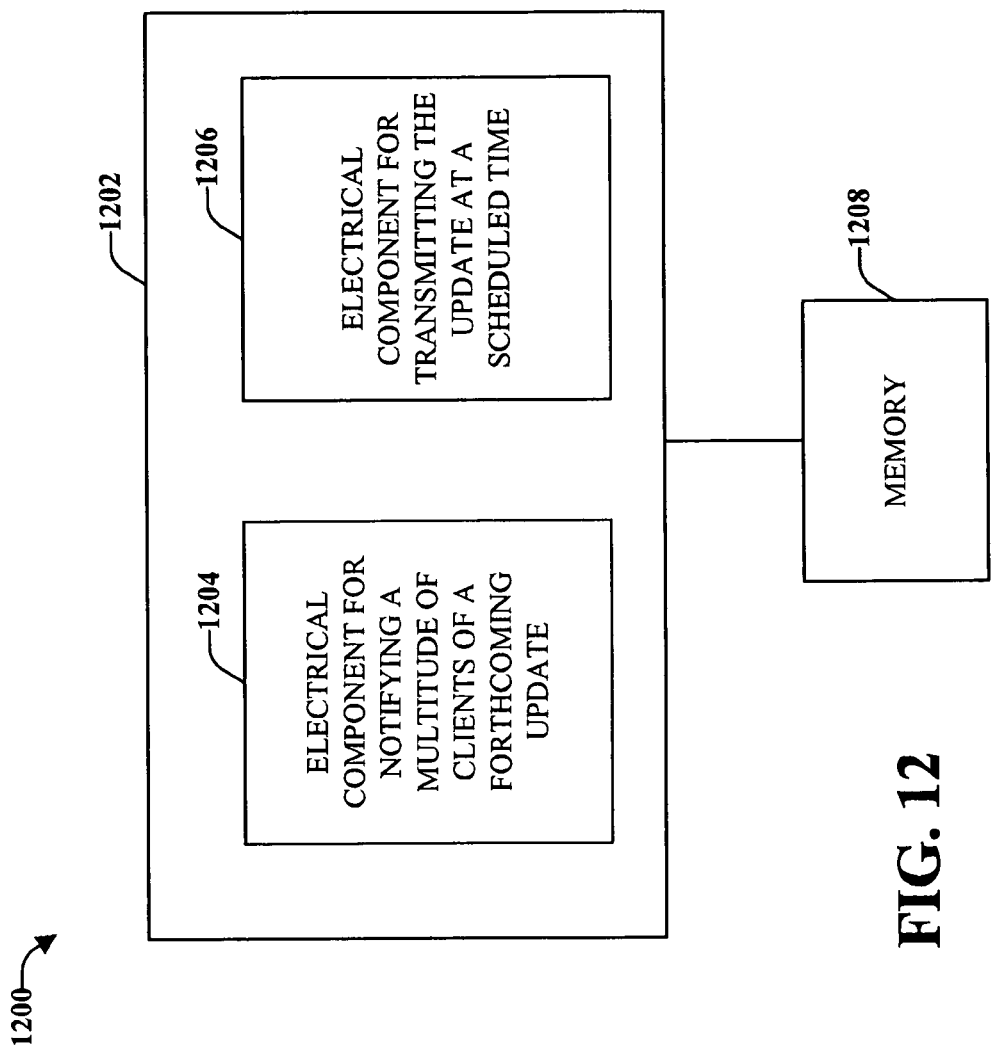
FIG. 12 illustrates an example system that selectively transmits a scheduled download.

With reference to FIG. 12, illustrated is an example system 1200 that selectively transmits a scheduled download. For example, system 1200 may reside at least partially within a base station. It is to be appreciated that system 1200 is represented as including functional blocks, which may be functional blocks that represent functions implemented by a processor, software, or combination thereof (e.g., firmware).

System 1200 includes a logical grouping 1202 of electrical components that can act separately or in conjunction. For instance, logical grouping 1202 may include an electrical component for notifying a multitude of clients of a forthcoming update 1204. Pursuant to an illustration, the forthcoming update can include non-time sensitive data. Further, logical grouping 1202 can comprise an electrical component for transmitting the update at a scheduled time 1206.

In accordance with some aspects, logical grouping 1202 can include an electrical component for classifying an update as a time-sensitive update or a non-time sensitive update. Also included can be an electrical component for broadcasting the update as real-time data and an electrical component for transmitting the non-time sensitive update as the forthcoming update. An electrical component for transmitting a time-sensitive update at substantially the same time it is broadcast might be included.

Additionally or alternatively, logical grouping 1202 can include an electrical component for scheduling the forthcoming update at a number of different times to allow the multitude of devices an opportunity to receive the update. Logical grouping 1202 can also include an electrical component for determining a time associated with at least one client device and an electrical component for sending the update based on the schedule time associated with the client device.

In accordance with some aspects, logical grouping 1202 can include an electrical component for receiving a request to send the update at a time different than the scheduled time and an electrical component for sending a unicast dedicated update in response to the request.

Additionally, system 1200 can include a memory 1208 that retains instructions for executing functions associated with electrical components 1204 and 1206 or other components. While shown as being external to memory 1208, it is to be understood that one or more of electrical components 1204 and 1206 may exist within memory 1208.

Figure 13:
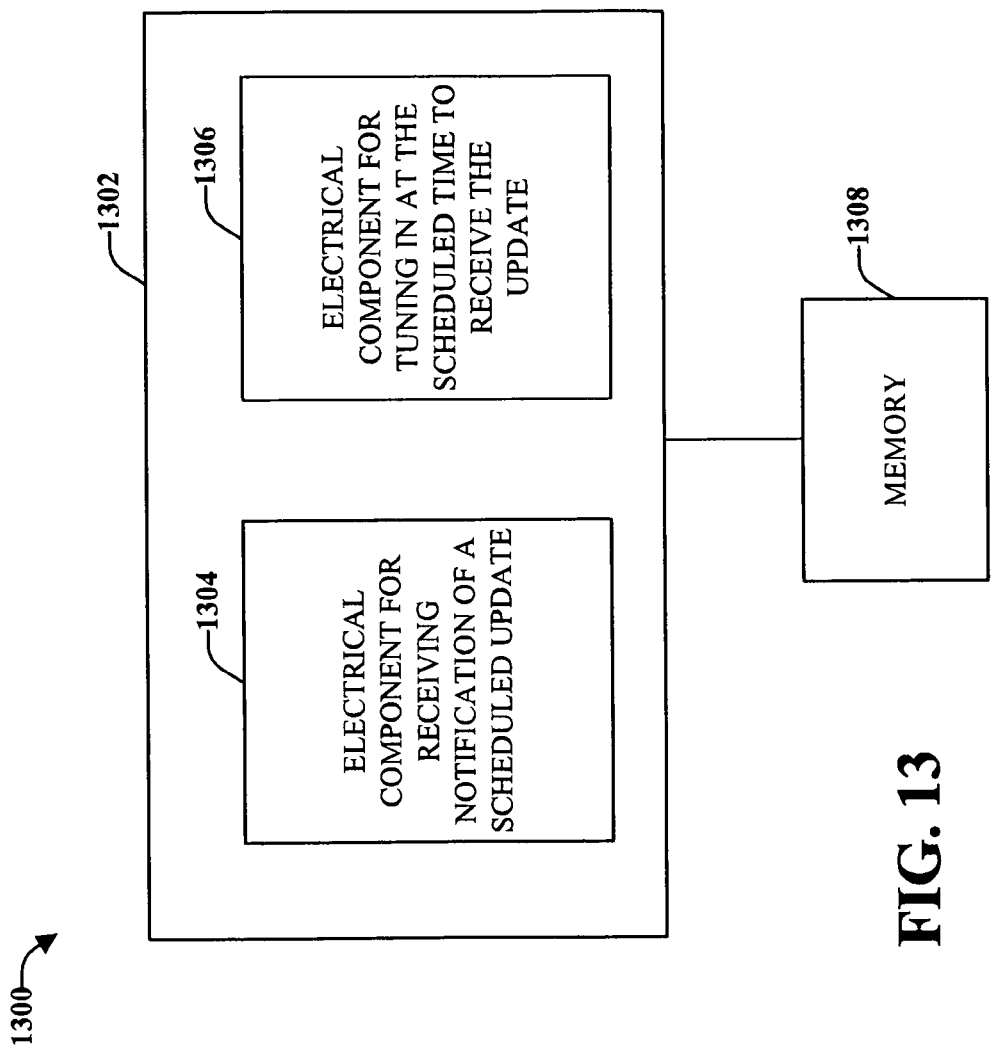
FIG. 13 illustrates an example system that selectively receives a scheduled download.

With reference to FIG. 13, illustrated is an example system 1300 that selectively receives a scheduled download. For example, system 1300 may reside at least partially within a mobile device. It is to be appreciated that system 1300 is represented as including functional blocks, which may be functional blocks that represent functions implemented by a processor, software, or combination thereof (e.g., firmware).

System 1300 includes a logical grouping 1302 of electrical components that can act separately or in conjunction. For instance, logical grouping 1302 may include an electrical component for receiving a notification of a scheduled update 1304. Pursuant to an illustration, the scheduled update can included non-time-sensitive data. Further, logical grouping 1302 can comprise an electrical component for tuning in at the scheduled time to receive the update 1306. The update can be received in a broadcast connection.

In accordance with some aspects, logical grouping 1302 can include an electrical component for automatically initiating a background functionality and an electrical component for downloading the scheduled update outside a primary application. Additionally or alternatively, logical grouping 1302 can include an electrical component for receiving alternative times for the scheduled update and an electrical component for selecting at least one of the alternative times for tuning in to receive the update. Further, logical grouping 1302 can include an electrical component for determining a period of low activity and an electrical component for selecting at least one of the alternative times that occurs during the period of low activity.

Additionally, system 1300 can include a memory 1308 that retains instructions for executing functions associated with electrical components 1304 and 1306 or other components. While shown as being external to memory 1308, it is to be understood that one or more of electrical components 1304 and 1306 may exist within memory 1308.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for transmitting scheduled downloads over a wireless communications system, comprising:
   scheduling a forthcoming update for a plurality of client devices at a plurality of times, wherein the forthcoming update is scheduled for the plurality of times before the forthcoming update is transmitted to any of the plurality of client devices;
   notifying the plurality of client devices of the forthcoming update; and
   transmitting the forthcoming update at each of the plurality of times, to allow the plurality of client devices an opportunity to receive the forthcoming update.

2. The method of claim 1, wherein the forthcoming update comprises non-time sensitive data.

3. The method of claim 1, further comprising:
classifying an update as a time-sensitive update or a non-time sensitive update;
broadcasting the time-sensitive update as real-time data; and
transmitting the non-time sensitive update as the forthcoming update.

4. The method of claim 1, further comprising:
receiving a request to send the forthcoming update at a time different from the plurality of times; and
sending a unicast dedicated update in response to the request.

5. The method of claim 1, wherein transmitting the forthcoming update at a scheduled time comprises:
determining the scheduled time of the plurality of times associated with at least one of the plurality of client devices; and
sending the forthcoming update based on the scheduled time associated with the at least one client device.

6. The method of claim 1, further comprises transmitting a time-sensitive update at substantially the same time as it is available.

7. A device for transmitting content over a wireless communications system, comprising:
a computer platform having a memory and a processor wherein the memory stores information related to decisions made by the processor;
a scheduler that schedules at least one non-time-sensitive update for a plurality of client devices at a plurality of times, wherein the at least one non-time-sensitive update is scheduled for the plurality of times before the at least one non-time-sensitive update is transmitted to any of the plurality of client devices;
an update notifier that informs the plurality of client devices of the plurality of times; and
a monitor that reviews the plurality of times and triggers a sender to transmit the at least one non-time sensitive update at each of the plurality of times.

8. The device of claim 7, wherein the monitor further compares the plurality of times with a current time.

9. The device of claim 8, wherein the current time is a time referenced by the device for transmission of content or a time referenced by at least one of the plurality of client devices.

10. The device of claim 7, wherein the sender broadcasts the at least one non-time-sensitive update on a dedicated broadcast channel.

11. The device of claim 10, wherein the dedicated broadcast channel is used to send other broadcast data during times other than the plurality of times.

12. The device of claim 7, wherein the sender conveys a unicast dedicated update based on a request from at least one of the plurality of client devices.

13. The device of claim 7, wherein the sender transmits a time-sensitive update at substantially the same time it is available.

14. A non-transitory machine-readable medium having stored thereon machine-executable instructions comprising:
at least one instruction to cause a server to schedule at least one non-time-sensitive update for a plurality of client devices at a plurality of times, wherein the at least one non-time-sensitive update is scheduled for the plurality of times before the at least one non-time-sensitive update update is transmitted to any of the plurality of client devices;
at least one instruction to cause the server to notify the plurality of client devices of the plurality of times; and
at least one instruction to cause the server to transmit, over a wireless communications system, the at least one non-time-sensitive update at each of the plurality of times.

15. The non-transitory machine-readable medium of claim 14, wherein the instructions further comprise at least one instruction to cause the server to compare the the plurality of times with a current time, wherein the current time is a time referenced by the server or a time referenced by at least one of the plurality of client devices.

16. The non-transitory machine-readable medium of claim 15, wherein the instructions further comprise:
at least one instruction to cause the server to broadcast the at least one non-time-sensitive update on a dedicated broadcast channel; and
at least one instruction to cause the server to send other broadcast data during times other than the plurality of times.

17. In a wireless communications system, an apparatus comprising:
a processor configured to:
schedule a forthcoming update for a plurality of client devices at a plurality of times, wherein the forthcoming update is scheduled for the plurality of times before the forthcoming update is transmitted to any of the plurality of client devices; and
a transmitter configured to:
notify the plurality of clients of the forthcoming update; and
transmit the forthcoming update at each of the plurality of times, to allow the plurality of client devices an opportunity to receive the forthcoming update.

18. A method for receiving a scheduled update over a wireless communications system, comprising:
receiving, at a wireless communications device, notification of the scheduled update, wherein the scheduled update is scheduled at a plurality of alternative times before the scheduled update is transmitted to the wireless communications device; and
tuning in, by the wireless communications device, at one of the plurality of alternative times to receive the scheduled update.

19. The method of claim 18, further comprising:
automatically initiating a background functionality; and
downloading the scheduled update outside a primary application.

20. The method of claim 18, wherein the scheduled update comprises non-time-sensitive data.

21. The method of claim 18, further comprising:
receiving the plurality of alternative times for the scheduled update; and
selecting at least one of the plurality of alternative times for tuning in to receive the scheduled update.

22. The method of claim 21, further comprising:
determining a period of low activity; and
selecting at least one of the plurality of alternative times that occurs during the period of low activity.

23. The method of claim 18, wherein the scheduled update is received in a broadcast connection.

24. The method of claim 18, further comprising:
determining that the scheduled update was not received during the one of the plurality of alternative times; and
requesting a dedicated update to be transmitted in a unicast environment.

25. The method of claim 18, further comprising receiving a time-sensitive update at substantially the same time as it is broadcast.

26. The method of claim 18, further comprising:
monitoring changes in an associated time zone; and
adjusting the one of the plurality of alternative times to correspond with the change to time zone.

27. A wireless communications apparatus, comprising:
a computer platform having a memory and a processor, wherein the memory stores information related to decisions made by the processor;
a transceiver that receives a notification of a scheduled update, wherein the scheduled update is scheduled at a plurality of alternative times before the scheduled update is transmitted to the wireless communications apparatus;
a schedule handler that monitors a current time and compares a scheduled time of the plurality of alternative times for the scheduled update with the current time; and
an update acceptor that initiates a background process to receive the scheduled update at the scheduled time.

28. The wireless communications apparatus of claim 27, wherein the schedule handler monitors changes in time zone of the wireless communication apparatus.

29. The wireless communications apparatus of claim 27, wherein the update acceptor receives the scheduled update when the wireless communication apparatus is idle.

30. The wireless communications apparatus of claim 27, wherein the update acceptor selectively disregards the scheduled update based on the wireless communication apparatus being busy.

31. The wireless communications apparatus of claim 27, wherein the scheduled update comprises non-critical data.

32. The wireless communications apparatus of claim 27, further comprising an optimizer that determines that the scheduled update was not received during the scheduled time and transmits a request for a dedicated update.

33. The wireless communications apparatus of claim 27, wherein the update acceptor makes a connection for time-since dictator while a user of the wireless communications apparatus is actively using an application.

34. A non-transitory machine-readable medium having stored thereon machine-executable instructions comprising:
at least one instruction to cause a wireless communications device to receive a notification of a scheduled update, wherein the scheduled update is scheduled at a plurality of alternative times before the scheduled update is transmitted to the wireless communications device;
at least one instruction to cause the wireless communications device to monitor a current time and compare a scheduled time of the plurality of alternative times for the scheduled update with the current time; and
initiating a background process to receive the scheduled update at the scheduled over a wireless communications system.

35. The non-transitory machine-readable medium of claim 34, further comprising at least one instruction to cause the wireless communications device to receive the scheduled update during a period of low activity.

36. In a wireless communications system, an apparatus comprising:
a processor configured to:
receive a notification of a scheduled update, wherein the scheduled update is scheduled at a plurality of alternative times before the scheduled update is transmitted to the wireless device;
cause a transceiver of the apparatus to tune in at one of the plurality of alternative times to receive the scheduled update;
automatically initiate a background functionality; and
cause the transceiver to download the scheduled update outside of a primary application at the one of the plurality of alternative times.

37. A non-transitory computer-readable medium for receiving a scheduled update over a wireless communications system, comprising:
at least one instruction to cause a wireless communications device to receive a notification of the scheduled update, wherein the scheduled update is scheduled at a plurality of alternative times before the scheduled update is transmitted to the wireless communications device; and
at least one instruction to cause the wireless communications device to tune in at one of the plurality of alternative times to receive the update.

38. A method for receiving a scheduled update over a wireless communications system, comprising:
determining, by a wireless communications device, whether the scheduled update is appropriate;
monitoring, by the wireless communications device, a current time and comparing a scheduled time for the scheduled update with the current time, wherein the scheduled time is one of a plurality of times for the scheduled update, and wherein the scheduled update is scheduled for the plurality of times before the scheduled update is transmitted to the wireless communications device; and
initiating, by the wireless communications device, a background process to receive the scheduled update over a wireless communications system.

* * * * *